(12) United States Patent
Madhusudhan Nair et al.

(10) Patent No.: US 11,366,704 B2
(45) Date of Patent: Jun. 21, 2022

(54) CONFIGURABLE ANALYTICS FOR MICROSERVICES PERFORMANCE ANALYSIS

(71) Applicant: SAP SE, Walldorf (DE)

(72) Inventors: Prem Roshan Madhusudhan Nair, Bangalore (IN); Ananya Kumar Mallik, Patna (IN)

(73) Assignee: SAP SE, Walldorf (DE)

( * ) Notice: Subject to any disclaimer, the term of this patent is extended or adjusted under 35 U.S.C. 154(b) by 18 days.

(21) Appl. No.: 16/201,880

(22) Filed: Nov. 27, 2018

(65) Prior Publication Data
US 2020/0167209 A1 May 28, 2020

(51) Int. Cl.
*G06F 9/54* (2006.01)
*G06F 16/26* (2019.01)
*G06F 16/21* (2019.01)

(52) U.S. Cl.
CPC .............. *G06F 9/54* (2013.01); *G06F 16/212* (2019.01); *G06F 16/26* (2019.01)

(58) Field of Classification Search
CPC ........... G06F 9/54; G06F 16/212; G06F 16/26
See application file for complete search history.

(56) References Cited

U.S. PATENT DOCUMENTS 7,627,671 B1 * 12/2009 Palma ................. G06F 11/3616
709/223
9,612,886 B2  4/2017 Han et al.
10,379,995 B1 * 8/2019 Walters ................ G06N 3/0454
10,489,358 B2 * 11/2019 Bhatti ................. G06F 16/9024
2012/0005243 A1 * 1/2012 Van der Merwe .... H04L 41/145
707/812

(Continued)

OTHER PUBLICATIONS

Kerherve, "Models for Metadata or Metamodels for Data", discloses metamodeling to efficiently support essential functions (title, abstract, and pp. 1-12). (Year: 1997).*

(Continued)

*Primary Examiner* — Doon Y Chow
*Assistant Examiner* — Phuong N Hoang
(74) *Attorney, Agent, or Firm* — Fountainhead Law Group P.C.

(57) ABSTRACT

Embodiments relate to a platform offering configurable analytics facilitating performance analysis between multiple Application Programming Interfaces (APIs)—e.g., APIs of individual microservices invoked by a cloud application as part of an end-to-end process flow. For purposes of performance monitoring, a visualization framework according to embodiments permits user configuration of end points of the cloud application. A library parses that configuration, storing analytics data in a schema provided by the application. The library can store metadata generated by the monitoring configuration, allowing generation of analytical reports based upon that metadata. Configuration options permit creating visualizations (e.g., charts) for individual microservice APIs, and co-relating data between APIs by providing contextual navigation from visualization of one API metric to another. In this manner, embodiments facilitate co-relation between performance recording for APIs of distinct individual microservice(s) invoked over the course of an end-to-end process flow of a cloud application.

10 Claims, 8 Drawing Sheets

(56) References Cited

U.S. PATENT DOCUMENTS

| | | |
|---|---|---|
| 2013/0061211 A1* | 3/2013 | Rama ................. G06F 8/73 |
| | | 717/126 |
| 2015/0128156 A1 | 5/2015 | Zhu et al. |
| 2016/0260108 A1* | 9/2016 | Bracewell .......... G06Q 30/0201 |
| 2016/0294667 A1* | 10/2016 | Prabhakar ............... H04L 67/28 |
| 2017/0160880 A1 | 6/2017 | Jose et al. |
| 2017/0168664 A1 | 6/2017 | Kashyap et al. |
| 2017/0289307 A1 | 10/2017 | Thompson et al. |
| 2018/0032534 A1 | 2/2018 | Koerner et al. |
| 2018/0088967 A1* | 3/2018 | Cooper ................. G06F 9/451 |
| 2018/0089290 A1* | 3/2018 | Haggie ................ G06F 3/0481 |
| 2018/0150384 A1* | 5/2018 | Alaranta ................ G06F 16/22 |
| 2018/0332447 A1* | 11/2018 | Rakovitsky ......... G06F 11/3438 |
| 2018/0373617 A1* | 12/2018 | Gaier ................. G06F 11/3082 |
| 2019/0065547 A1* | 2/2019 | Yang ................ G06F 16/24526 |
| 2019/0370370 A1* | 12/2019 | Wittern .................... G06F 9/54 |

OTHER PUBLICATIONS

"Data Driven Documents", Online https://d3js.org, Sep. 3, 2018, 7 pages.

More Real User Monitoring Metrics Now Available in Dynatrace API, Online https://www.dynatrace.com/news/blog/new-real-user-monitoring-metrics-now-available-in-dynatrace-api/, Sep. 3, 2018, 10 pages.

* cited by examiner

CONFIGURABLE ANALYTICS FOR MICROSERVICES PERFORMANCE ANALYSIS

BACKGROUND

Unless otherwise indicated herein, the approaches described in this section are not prior art to the claims in this application and are not admitted to be prior art by inclusion in this section.

Performance monitoring of a computer application has typically been performed based upon specific metrics of a fixed schema, using static visualization types. As a result, the fixed schema and visualization types for performance monitoring are limited those dictated by a specific Application Programming Interface (API) of the computer application that is being invoked by a user.

Such static, predetermined performance monitoring, may be of limited benefit in the context of modern cloud environments. Specifically, over the course of a single end-to-end user process being performed on the cloud, a number of distinct individual microservices may be invoked. Lack of compatibility between the static schemas of each API of those different microservices, may interfere with accurate performance monitoring of the cloud application.

SUMMARY

Embodiments relate to a platform offering configurable analytics that facilitate performance monitoring/analysis, between performance metrics available from multiple different Application Programming Interfaces (APIs). In an example, these APIs may be of individual microservices that are invoked by a cloud application as part of an end-to-end process flow. For purposes of performance monitoring and visualization, a framework according to embodiments permits user configuration of end points of the cloud application. A library parses that configuration, storing performance metric data in a schema provided by the application. The library can store metadata generated by the monitoring configuration, allowing generation of analytical reports based upon that metadata. Embodiments allow creating visualizations (e.g., charts) for performance metrics available from individual microservice APIs, and co-relating those metrics between APIs by providing contextual navigation from visualization of one API metric to another. In this manner, embodiments facilitate co-relation between performance recording for APIs of distinct individual microservice(s) that are invoked over the course of an end-to-end process flow of a cloud application.

An embodiment of a computer-implemented method comprises receiving from a first application programming interface (API), a first performance metric of a first application executing a process flow. The first performance metric is stored in a database according to a schema. A second performance metric that does not comply with the schema, is received from second API of a second application invoked by the first application during the process flow. Metadata of a first model stored in the database, is referenced to co-relate the second performance metric with the first performance metric according to the schema. A visualization reflecting the first performance metric co-related to the second performance metric, is generated.

A non-transitory computer readable storage medium embodies a computer program for performing a method comprising receiving from a first application programming interface (API), a first performance metric of a first application executing a process flow. The first performance metric is stored in a database according to a schema. A second performance metric that does not comply with the schema, is received from a second API of a second application invoked by the first application during the process flow. A configuration is parsed to generate metadata of a first model stored in the database. The metadata is referenced to co-relate the second performance metric with the first performance metric according to the schema. A visualization reflecting the first performance metric co-related to the second performance metric, is generated.

An embodiment of a computer system comprises one or more processors and a software program executable on said computer system. The software program is configured to cause an in-memory database engine of an in-memory database to receive from a first application programming interface (API), a first performance metric of a first application executing a process flow. The software program is further configured to cause the in-memory database engine to store the first performance metric in the in-memory database according to a schema, and to receive from a second API of a second application invoked by the first application during the process flow, a second performance metric that does not comply with the schema. The software program is further configured to cause the in-memory database engine to reference metadata of a first model stored in the in-memory database, to co-relate the second performance metric with the first performance metric according to the schema. A visualization is generated reflecting the first performance metric co-related to the second performance metric.

Some embodiments further comprise receiving a first input comprising an endpoint of the process flow, receiving a second input comprising a configuration, and parsing the configuration to create the metadata.

According to particular embodiments, the configuration identifies a field in a signature of the second API.

In various embodiments the configuration comprises an XML configuration.

According to certain embodiments the configuration comprises an annotation on an API class.

In some embodiments the second application comprises a microservice invoked via a communications network.

Particular embodiments may further comprise receiving from a third API of a third application invoked by the second application, a third performance metric that does not comply with the schema. The metadata is referenced to co-relate the third performance metric with the first performance metric according to the schema. The visualization is generated reflecting the third performance metric co-related to the first performance metric.

Where the first model comprises a process model including a portion of the metadata, certain embodiments may further comprise referencing the portion of the metadata in an API model stored within the database in order to co-relate the second performance metric with the first performance metric.

According to various embodiments the first performance metric defines one of execution time, memory utilization, and processing resource utilization.

In particular embodiments the database comprises an in-memory database, and the referencing is performed by an in-memory database engine of the in-memory database.

The following detailed description and accompanying drawings provide a better understanding of the nature and advantages of various embodiments.

DETAILED DESCRIPTION

Described herein are methods and apparatuses implementing performance analysis according to various embodiments. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
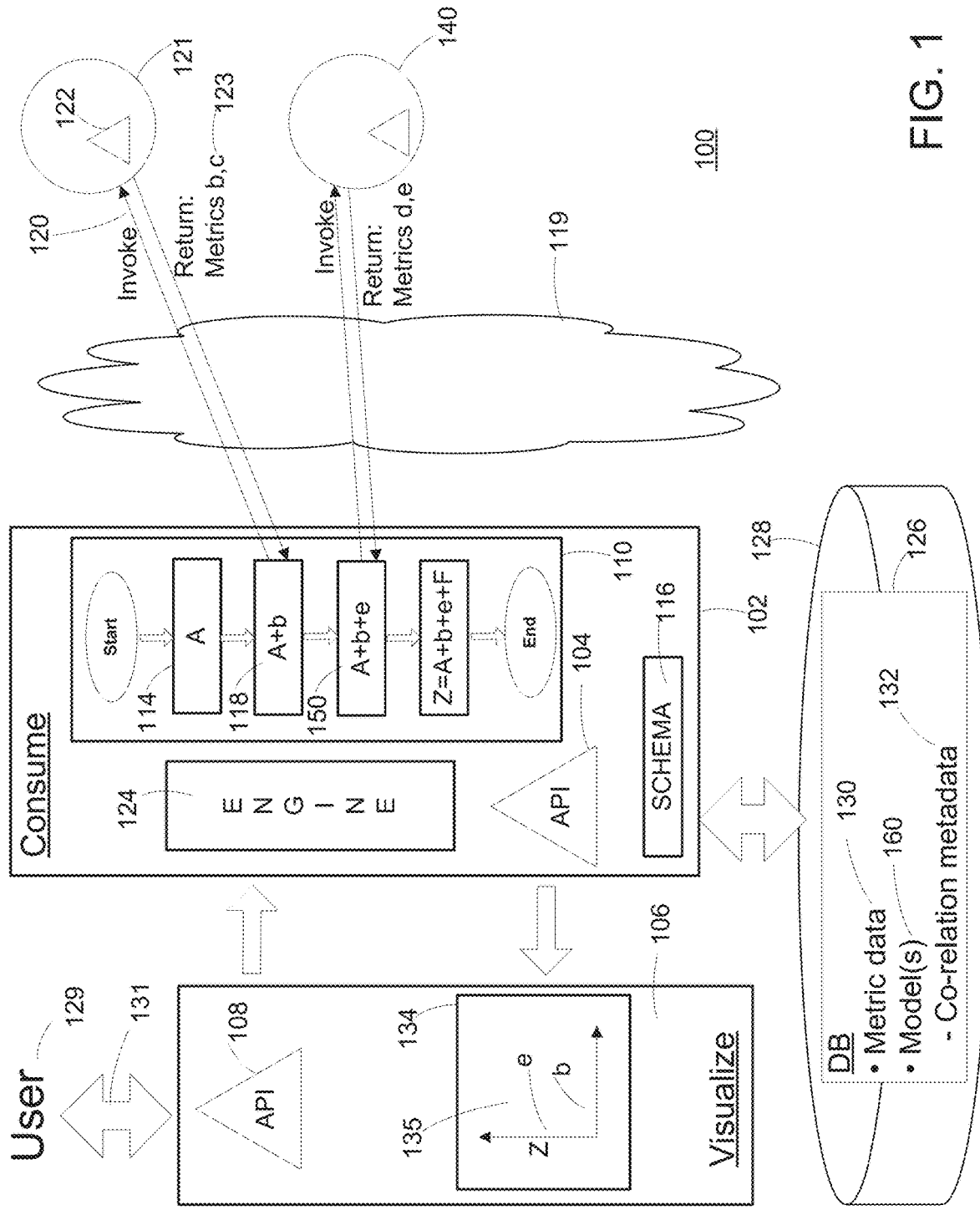
FIG. 1 shows a simplified diagram of a system according to an embodiment.

FIG. 1 shows a simplified view of an example system that is configured to implement performance analysis according to an embodiment. Specifically, system 100 comprises a consuming application 102 including API 104, and a visualization layer 106 including API 108.

The consuming application includes an end-to-end process flow 110 including a starting point 112, a plurality of stages 114, and an ending point 116. The initial stage 114 may involve an internal action characterized by a performance metric A, that is defined according to a schema 116 that is defined by the consuming application. In one example, the specific performance metric A may comprise an execution time for the stage 114.

A subsequent stage 118 of the end-to-end process flow may reach outside of the consuming application into the cloud 119, to invoke 120 a first external micro-service 121. In one possible example, such a micro-service may be specifically dedicated to creating a shopping cart environment for the purchase of items.

The API 122 of that external microservice, may return performance metrics b, c 123 that are not specific to/consistent with the schema of the consuming application. That is, the microservice has its own internal set of metrics characterizing its performance.

Accordingly, the consuming application further includes a library engine 124. The role of this engine is to receive the performance metric b, and to co-relate it to the performance metric A that is defined according to the known schema.

In particular, the engine may store in a database 126 of a non-transitory computer storage medium 128, the data 130 of the performance metrics, together with one or more models 160 including associated metadata 132 that allows co-relation between the performance metrics.

For example, the metadata could indicate the performance metric "a" as representing a particular quantity (e.g., execution time) rather than some entirely different performance indicia e.g., memory utilization (as represented by performance metric c that is returned by the API 122). Further details regarding the role of the model(s) are illustrated in connection with the specific example described later below.

FIG. 1 further shows the visualization layer as being in communication with the user 129, as well as with the consuming application. The visualization layer is configured to receive user inputs 131, and to communicate with the consuming application in order generate and render a performance analytic visualization 134. That visualization is based upon the co-relation between performance metrics that is recognized by the engine based upon the metadata.

As inputs to the performance analytics system, users can provide the endpoints of the process flows that are to be monitored. Users may provide as inputs, configuration of the fields in the API signature that identify the input fields. This can be provided as an XML configuration, or as an annotation on the API classes.

During runtime, the library engine parses the configuration. Based on the configuration, the library engine creates the necessary metadata within the analytics tool. Utilizing historical data to perform the analysis, the consuming application creates a persistence store (e.g., schema in relational database) in order to store the runtime analytics.

Once the metadata is written based upon the analytics configuration, appropriate visualizations may be generated and rendered based on the metadata. This can serve to establish co-relation between multiple such analytics configurations.

Visualization of co-related performance metrics may be generated as follows. Specifically, once the metadata co-relation is performed, a performance metric can be read across multiple APIs based on the input data value as dimension. This allows reading performance metrics across APIs for the given dataset. The Visualization can be generated using a variety of different types of UI visualization framework (e.g., D3).

FIG. 1 shows the visualization layer rendering an analytics visualization of the performance metrics that have been co-related by the library engine. In the high simplified example of FIG. 1, this visualization takes the form of a plot 135 of the relative contributions to overall execution time Z of the entire process flow, broken down by:

the relative contribution b of the execution time of the first microservice 121, and the relative contribution e of the execution time of the second external microservice 140.

In one example, second external microservice 140 invoked by the process flow, could be dedicated to performing a tax calculation during a third stage of the process flow 150.

Inspection of this visualization may prove highly valuable to developers, in particular, the visualization may permit rapid, accurate assessment of the performance of the consuming application. That is, co-relation of metrics accomplished by the library engine, rapidly indicates the second external microservice invoked by third process flow stage 150, as contributing to the overall process flow execution time.

Figure 2:
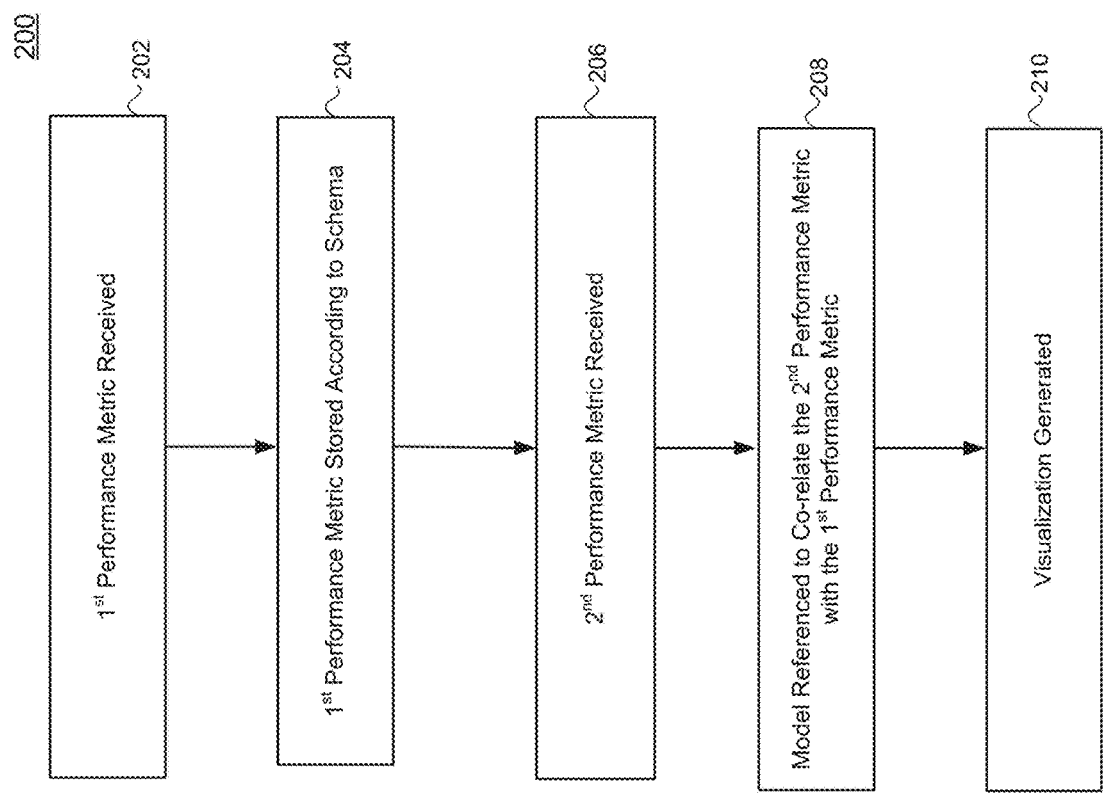
FIG. 2 shows a simplified flow diagram of a method according to an embodiment.

FIG. 2 is a flow diagram showing various actions taken in a method 200 according to an embodiment. At 202, an engine receives from a first application programming interface (API), a first performance metric of a first application executing a process flow.

At 204 the first performance metric is stored in a database according to a schema. At 206, the engine receives from a second API of a second application invoked by the first application during the process flow, a second performance metric that does not comply with the schema.

At 208 the engine references metadata of a first model stored in the database, to co-relate the second performance metric with the first performance metric according to the schema. At 210, a visualization is generated that reflects the first performance metric co-related to the second performance metric.

It is noted that various embodiments may offer one or more benefits. One possible benefit is the ability to integrate analytics performance across multiple APIs.

In particular, performance monitoring tools are typically specific to a given particular API, and do not readily accommodate attempted co-relation of data between calls to multiple different APIs. By contrast, embodiments offer value in the context of cloud native architectures, where a number of different microservices each having its own distinct API) may be invoked over the course of realizing a single end-to-end flow for the user.

It is further noted that conventional reporting techniques may not permit customized configuration of visualization options. And, options to specify those particular APIs needing to be monitored, may not be offered. This can lead to the unwanted capture of excessive, unrelated data.

Specific details regarding approaches for conducting performance analysis according to embodiments, are now provided in connection with a particular example.

EXAMPLE

Here, this example is based upon certain technologies available from SAP SE, of Walldorf, Germany. In particular, the consuming application may be a cloud-based SAP application.

Figure 3:
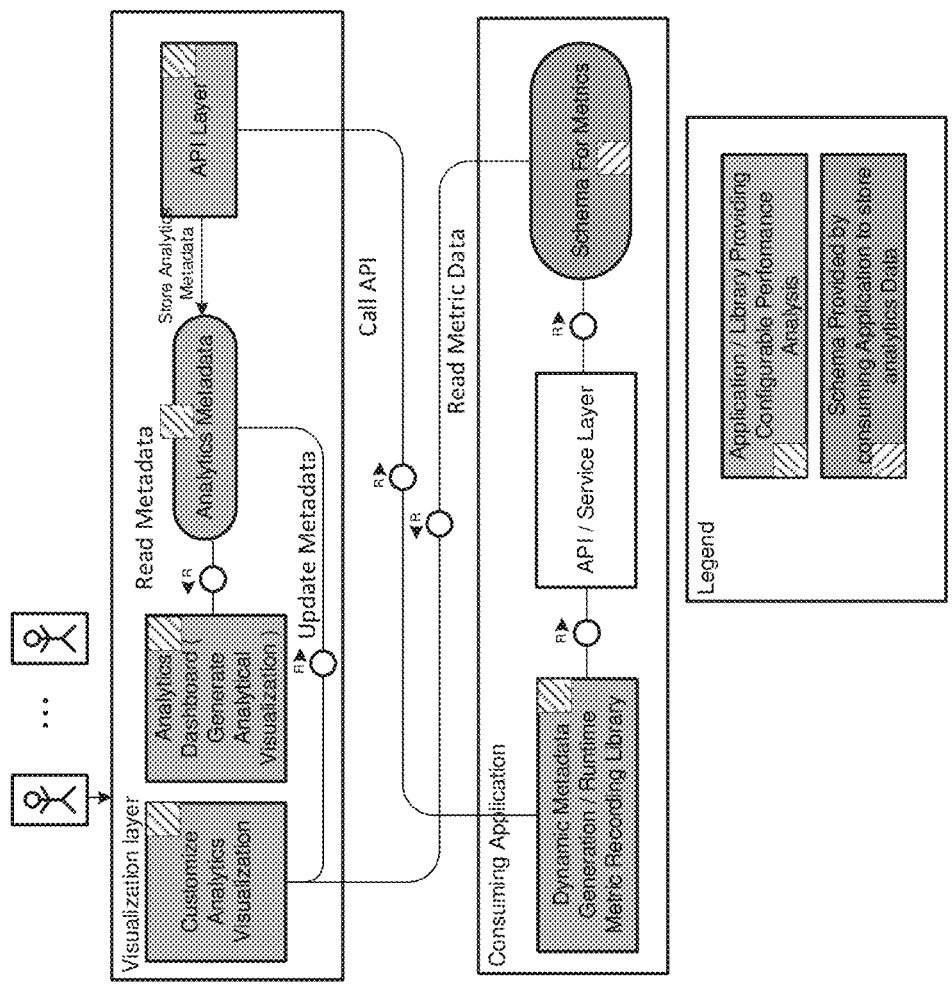
FIG. 3 is a simplified block diagram showing components of a performance analytics system according to an embodiment.

FIG. 3 is a simplified block diagram showing components of a performance analytics system according to an embodiment. The visualization layer may utilize the D3.js JavaScript library for producing dynamic, interactive data visualizations in web browsers.

Figure 4:
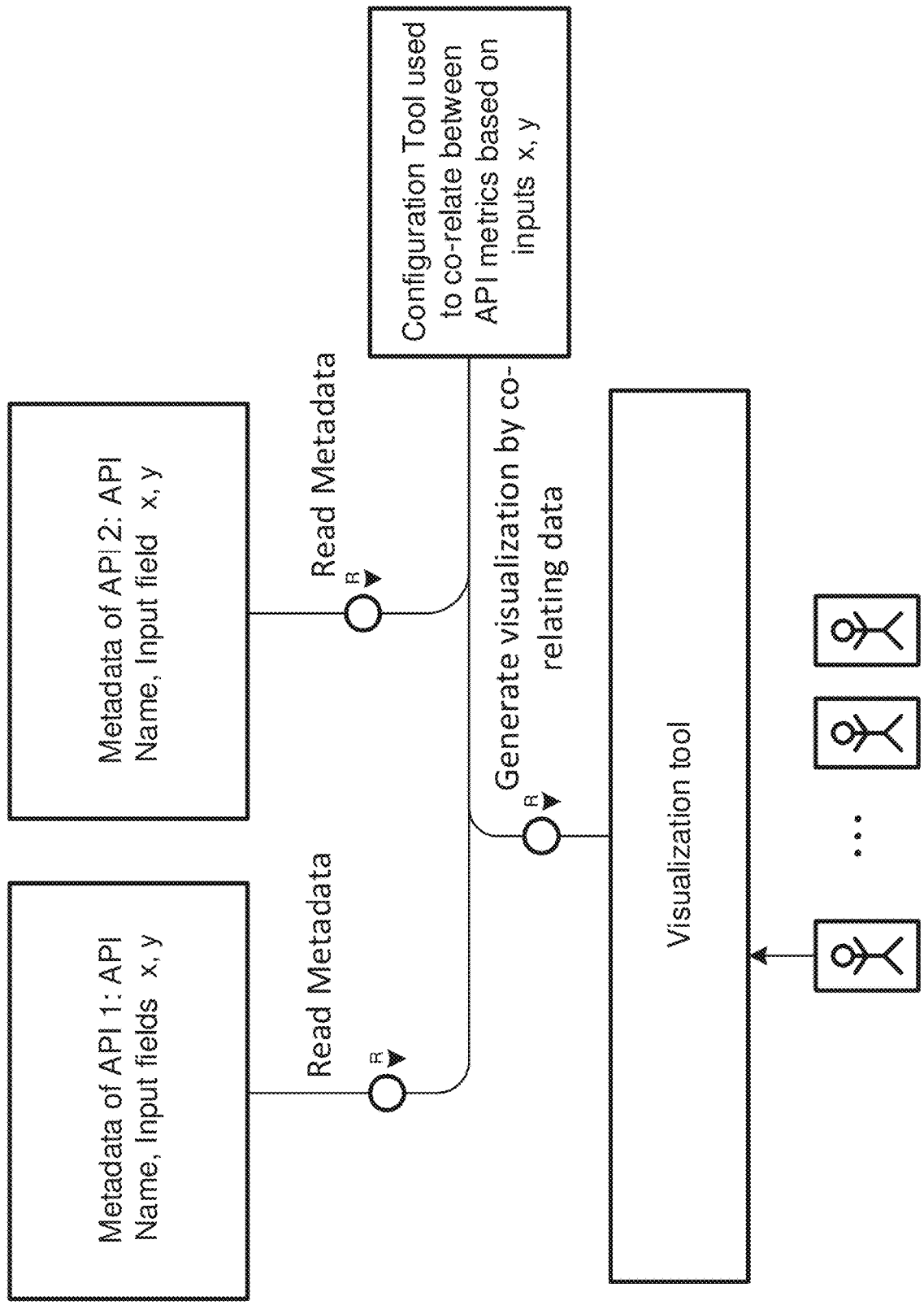
FIG. 4 is a simplified diagram showing flows of information between system components according to an exemplary system.

FIG. 4 is a simplified diagram showing flows of information between system components according to an exemplary system. In particular, this figure shows the configuration tool receiving inputs x, y from a first API 1, and receiving inputs x, y from a second API 2, where the inputs x, y are relevant to a common performance attribute (e.g., processing time).

The configuration tool is used to co-relate between API metrics based upon the inputs x, y. This allows the visualization tool to in turn generate relevant visualization(s) of performance, based upon the co-related API metrics.

Figure 5:
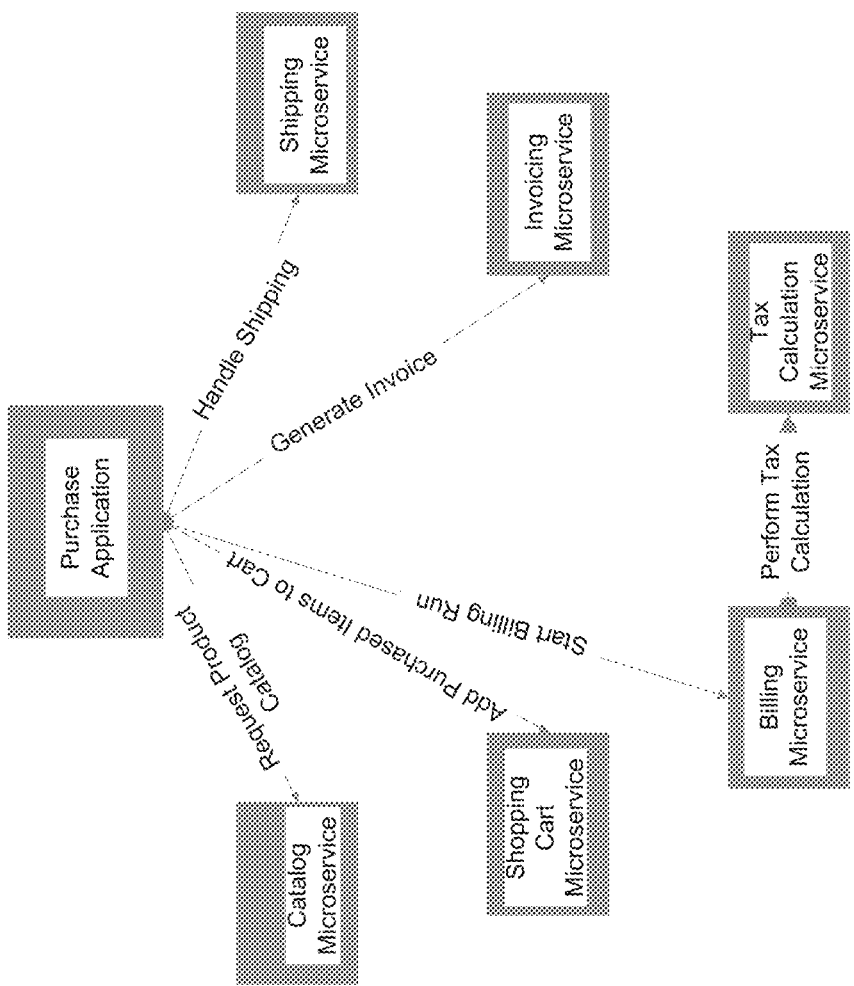
FIG. 5 is a simplified diagram showing an exemplary purchasing process flow invoking various microservices.

FIG. 5 is a simplified diagram illustrating an exemplary purchase order process flow scenario. Here, the following various different functions of the purchase process are performed by respective individual microservices (e.g., listed below in approximate order of invocation by the purchasing application):
catalog microservice;
shopping cart microservice;
billing microservice;
tax calculation microservice;
invoicing microservice;
shipping microservice.

Here, it is noted that while the purchasing application directly invokes many of the microservices, in at least one instance a microservice invokes another microservice.

Over the course of creating a purchase order, execution context is transferred between the different microservices. These perform individual actions and necessary state changes in order to successfully complete the purchase order creation process.

Figure 6:
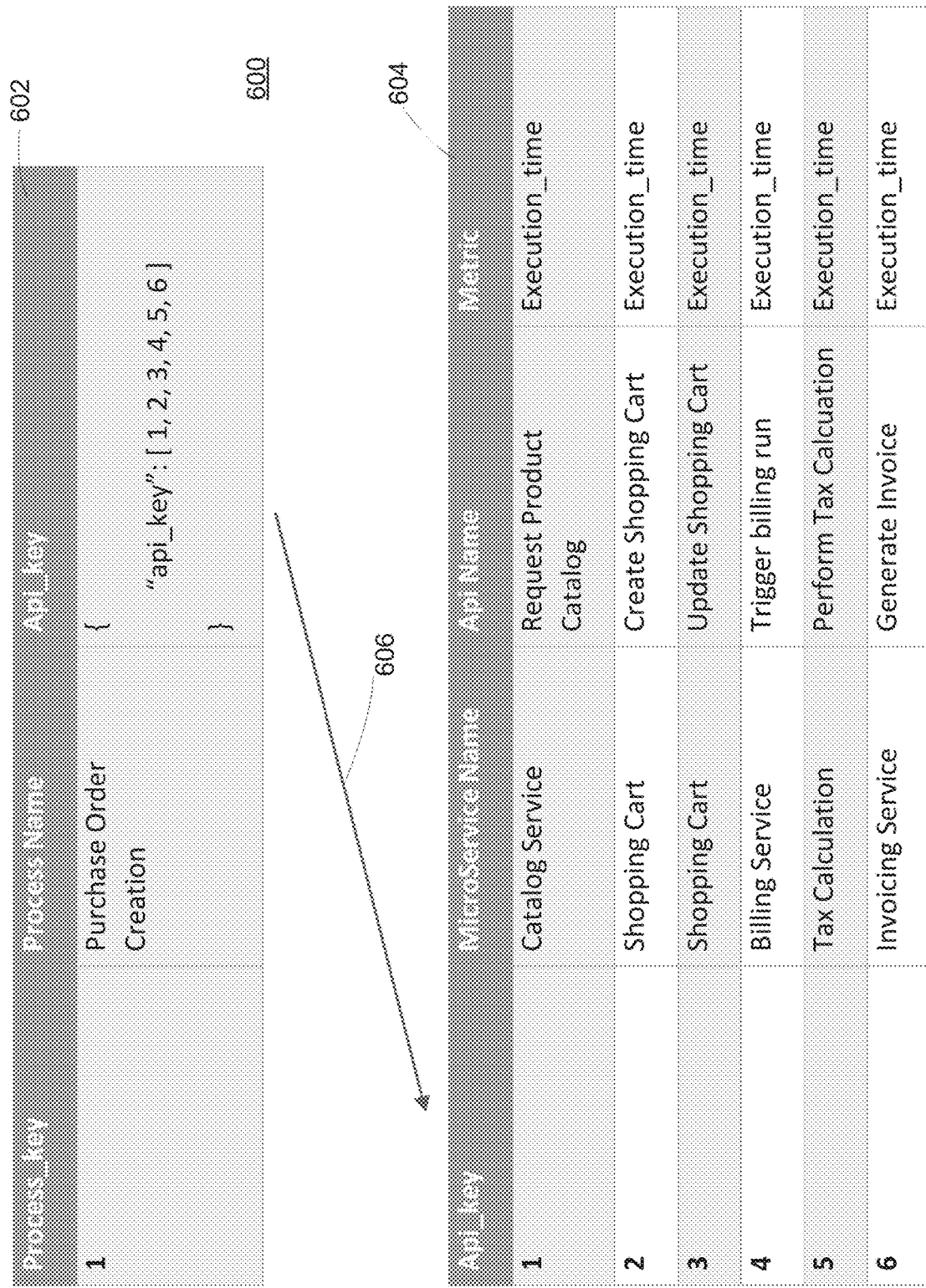
FIG. 6 is a simplified diagram showing stored models including metadata.

The library for metadata generation may be embedded at the container level for each microservice. The provided configuration identifies the APIs to be monitored, as well as the metric for analysis. Examples of such performance metrics that can be monitored at the microservice level, may include but are not limited to:
execution time
memory utilization
processing resource (e.g., CPU) utilization FIG. 6 is a simplified diagram illustrating a relationship 600 between different stored models that may permit the co-relation of performance metrics according to uniform schema of the consuming application. The library engine generates the required metadata and relationship between the individual APIs using a common process model 602, that links the different APIs.

FIG. 6 also shows the API model 604 that is employed to identify the performance metric being monitored. This API model is used to define the metadata for all the APIs being monitored, and the metric used for monitoring. Here, in this high simplified example the Api_key metadata 606 serves to relate the process model and the API model. Analytics configuration according to embodiments is built on top of this relationship in order to allow creating the visualizations for this model.

Returning now to FIG. 1, while that particular embodiment depicts the engine as residing outside of the database itself, this is not required. According to alternative embodiments the engine could be integrated with the database itself, for example to leverage the processing power of the in-memory database engine of the in-memory database storing the library. One example is the HANA in-memory database available from SAP SE of Walldorf, Germany.

Figure 7:
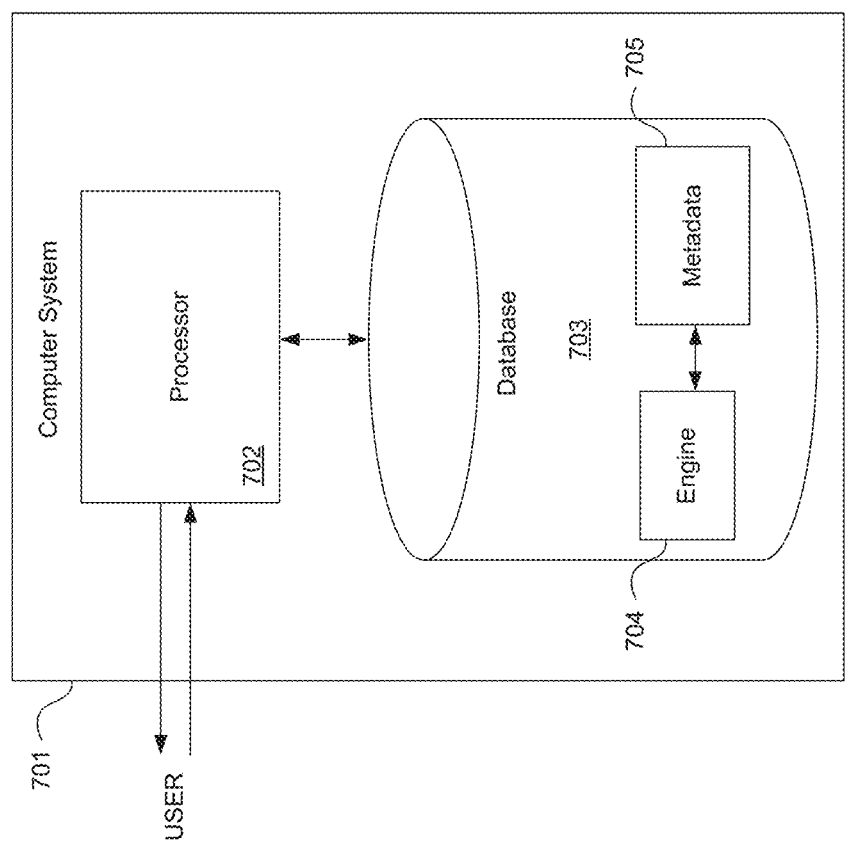
FIG. 7 illustrates hardware of a special purpose computing machine according to an embodiment that is configured to implement performance analysis.

FIG. 7 illustrates hardware of a special purpose computing machine configured to implement entity-based service operation for object-based persistence according to an embodiment. In particular, computer system 701 comprises a processor 702 that is in electronic communication with a non-transitory computer-readable storage medium comprising a database 703. This computer-readable storage medium has stored thereon code 705 corresponding to a model including analytics metadata. Code 704 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 8:
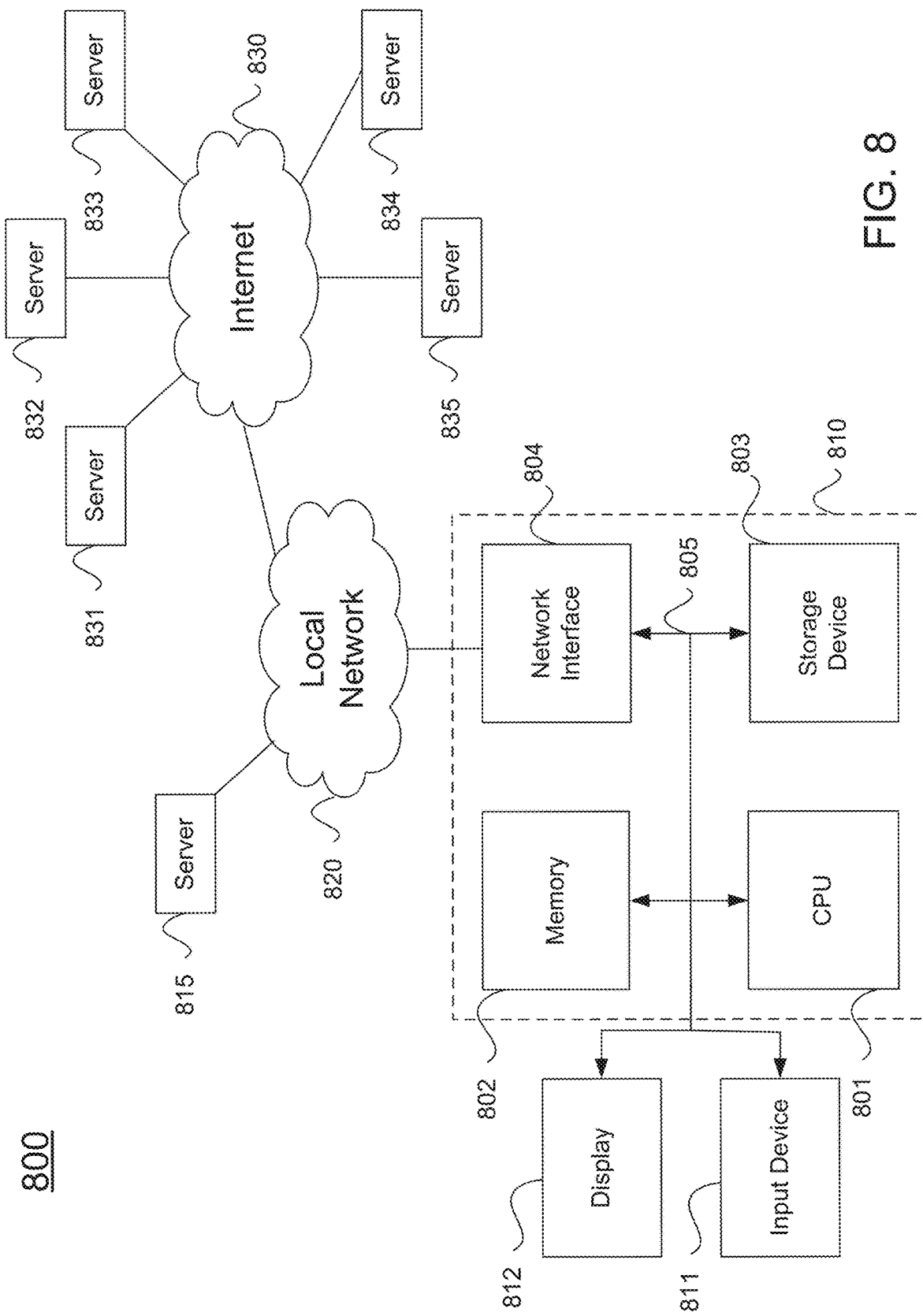
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving, by a library engine of a cloud application, from a first application programming interface (API) of a first microservice, a first performance metric, the first microservice being invoked by the cloud application as part of a process flow;
storing the first performance metric in a database according to a schema that is defined by the cloud application;
receiving, by the library engine, from a second API of a second microservice invoked by the cloud application during another stage of the process flow, a second performance metric that does not comply with the schema, wherein both the first and second performance metrics are relevant to a common overall performance metric;
generating, via the library engine, analytics metadata by using a process model that links the first and second APIs, and storing the analytics metadata with the process model in the database, wherein the generating comprises,
receiving a first input comprising an endpoint of the process flow,
receiving a second input comprising a configuration including an annotation on an API class, and
parsing the configuration to generate the analytics metadata;
referencing, by the library engine, the analytics metadata to co-relate the second performance metric with the first performance metric according to the schema; and
generating an analytics visualization reflecting the first performance metric of the first microservice co-related to the second performance metric of the second microservice, the visualization depicting a relative contribution of the first performance metric and the second performance metric to the overall performance metric of the process flow.

2. A method as in claim 1 wherein the second microservice is invoked via a communications network.

3. A method as in claim 1 further comprising:
receiving from a third API of a third microservice invoked by the second microservice, a third performance metric that does not comply with the schema;
referencing the metadata to co-relate the third performance metric with the first performance metric according to the schema; and
generating from the library the visualization reflecting the third performance metric co-related to the first performance metric.

4. A method as in claim 1 wherein:
the method further comprises referencing the portion of the metadata in an API model stored within the database in order to co-relate the second performance metric with the first performance metric.

5. A method as in claim 1 wherein the first performance metric defines one of execution time, memory utilization, and processing resource utilization.

6. A method as in claim 1 wherein:
the database comprises an in-memory database; and
the referencing is performed by an in-memory database engine of the in-memory database.

7. A non-transitory computer readable storage medium embodying a computer program for performing a method, said method comprising:

receiving, by a library engine of a cloud application, from a first application programming interface (API) of a first microservice, a first performance metric, the first microservice being invoked by the cloud application as part of a process flow;

storing the first performance metric in a database according to a schema that is defined by the cloud application;

receiving, by the library engine, from a second API of a second microservice invoked by the cloud application during another stage of the process flow, a second performance metric that does not comply with the schema, wherein both the first and second performance metrics are relevant to a common overall performance metric;

parsing, by the library engine, a configuration to generate analytics metadata of a first model and storing the analytics metadata with the first model in the database, wherein the configuration comprises an annotation on an API class;

referencing, by the library engine, the analytics metadata to co-relate the second performance metric with the first performance metric according to the schema; and generating an analytics visualization reflecting the first performance metric of the first microservice co-related to the second performance metric of the second microservice, the visualization depicting a relative contribution of the first performance metric and the second performance metric to the overall performance metric of the process flow.

8. A non-transitory computer readable storage medium as in claim 7 wherein:

the method further comprises referencing the portion of the metadata in an API model stored within the database, in order to co-relate the second performance metric with the first performance metric.

9. A computer system comprising:

one or more processors;

a software program, executable on said computer system, the software program configured to cause an in-memory database engine of an in-memory database to:

receive, by a cloud application, from a first application programming interface (API) of a first microservice, a first performance metric, the first microservice being invoked by the cloud application as part of a process flow;

store the first performance metric in the in-memory database according to a schema that is defined by the cloud application;

receive from a second API of a second microservice invoked by the cloud application during another stage of the process flow, a second performance metric that does not comply with the schema, wherein both the first and the second performance metrics are relevant to a common overall performance metric;

generate analytics metadata by using a process model that links the first and second APIs, and store the analytics metadata with the process model in the in-memory database, wherein the analytics metadata is generated by, receiving a first input comprising an endpoint of the process flow, receiving a second input comprising a configuration including an annotation on an API class, and parsing the configuration to generate the analytics metadata;

referencing the analytics metadata to co-relate the second performance metric with the first performance metric according to the schema; and generate an analytics visualization reflecting the first performance metric of the first microservice co-related to the second performance metric of the second microservice, the visualization depicting a relative contribution of the first performance metric and the second performance metric to the overall performance metric of the process flow.

10. A computer system as in claim 9 wherein:

the software program is further configured to cause the in-memory database engine to reference the portion of the metadata in an API model stored within the in-memory database, in order to co-relate the second performance metric with the first performance metric.

* * * * *